United States Patent

Iwata et al.

[11] 3,930,574
[45] Jan. 6, 1976

[54] APPARATUS FOR ORIENTING AND ACCUMULATING CONTAINERS

[75] Inventors: Kazushige Iwata; Minoru Hosoya, both of Tokyo, Japan

[73] Assignee: Kao Soap Co., Ltd., Tokyo, Japan

[22] Filed: Oct. 22, 1974

[21] Appl. No.: 516,888

Related U.S. Application Data

[63] Continuation-in-part of Ser. No. 350,172, April 11, 1973, abandoned.

[30] Foreign Application Priority Data

Apr. 13, 1972 Japan.............................. 47-43766

[52] U.S. Cl. ................ 198/246; 198/266; 198/278; 198/30
[51] Int. Cl.² ......................................... B65G 47/24
[58] Field of Search ........... 198/254, 267, 278, 279, 198/282, 29, 30, 234, 246, 264, 266

[56] References Cited
UNITED STATES PATENTS

| 907,116 | 12/1908 | Baker................. | 198/266 |
|---|---|---|---|
| 1,876,066 | 9/1932 | Logan................. | 198/266 |
| 2,198,594 | 4/1940 | Mundy................ | 198/29 |
| 2,667,959 | 9/1951 | Rogers................ | 198/246 |
| 3,084,090 | 4/1963 | Rambo et al. ....... | 198/264 |
| 3,256,971 | 6/1966 | Arnett................. | 198/30 |
| 3,467,237 | 9/1969 | Hanckamp........... | 198/264 |

*Primary Examiner*—James B. Marbert
*Assistant Examiner*—Richard K. Thomson
*Attorney, Agent, or Firm*—Woodhams, Blanchard and Flynn

[57] ABSTRACT

An apparatus for transporting and accumulating containers, specifically oval containers. A pair of opposed side guides are mounted adjacent a conveyer and define a transporting passage therebetween having a width only slightly greater than the small diameter of the containers so that the containers are transported therethrough in a direction substantially parallel with their long diameters. The conveyer has a further pair of side guides associated therewith spaced downstream from the first-mentioned side guides and spaced apart by distance substantially equal to the long diameter of the containers for permitting the containers to be accumulated substantially adjacent one another with the containers disposed with the long diameters thereof extending substantially transverse to the direction of conveyer travel. The first and second sets of side guides are connected by a set of inclined side guides which gradually taper outwardly from the first set to the second set for enabling the individual containers to be gradually turned through approximately 90° relative to the conveyer as they are transported from the transporting zone into the accumulating zone.

6 Claims, 5 Drawing Figures

APPARATUS FOR ORIENTING AND ACCUMULATING CONTAINERS

This application is a continuation-in-part of application Ser. No. 350,172 filed Apr. 11, 1973, now abandoned.

FIELD OF THE INVENTION

This invention relates to an apparatus for orienting and accumulating containers, and specifically relates to a conveyer device which permits oval or eliptical containers or bottles to be accumulated in a row to facilitate subsequent packing thereof into cartons or the like.

BACKGROUND OF THE INVENTION

When containers or bottles having oval or eliptical cross-sections are transported on a conveyer, such as an endless belt-type conveyer, the direction of movement of the containers is substantially parallel with the direction of the long diameter of the containers to prevent overturning or tipping of the containers during transporting thereof. When it is desired to accumulate these containers to facilitate their packaging in a cardboard box or the like, the containers are normally continuously introduced by the conveyer into a substantially closed area which is surrounded by walls, which area thus stops and collects the containers to permit the containers to be placed into boxes or the like. However, when utilizing an accumulating structure of this type, since the containers are fed into the accumulation area by being moved in a direction parallel to their long diameter, the subsequent containers tend to wedge in around the stopped frontmost container, thus causing a chain-like reaction back along the conveyer so that the following containers are likewise wedged together due to their direction of orientation relative to the conveyer. This thus results in a stoppage of the containers on the conveyer. These known structures thus have not successfully permitted an efficient and desirable accumulation of the bottles or containers.

Accordingly, it is an object of the present invention to provide an apparatus for accumulating substantially flat bottomed vessels, bottles, containers or the like, which apparatus specifically overcomes the above-mentioned disadvantage. More particularly, it is an object of the present invention to provide an apparatus which includes a zone for transporting the bottles or containers in a direction so that their long diameters are substantially parallel to the direction of travel, the conveyer also including an orienting zone for causing the containers to be rotated approximately 90° relative to the plane of the conveying surface so that the long diameters of the containers are substantially perpendicular to the transporting direction, the turned containers then being fed into an accumulation zone so that the containers are accumulated in side-by-side relation so as to form an elongated row of substantially stationary containers disposed with their small diameters substantially aligned.

More particularly, the present invention has for its object the provision of an apparatus for facilitating the accumulation of containers, bottles or the like. The present device is characterized by the provision of a pair of side guides which define an elongated orientation passage therebetween, which side guides are inclined relative to one another so that the passage tapers outwardly in the direction of travel, the narrow end of the orientation passage being in communication with a transporting passage formed on a conveyer, and the wide end of the orientation passage being in communication with an accumulation zone formed on the conveyer.

In the following description, the word "forward" and derivatives thereof will refer to the normal direction of travel of the containers along the conveyer, which forward direction of travel occurs rightwardly in FIG. 1.

Figure 1:
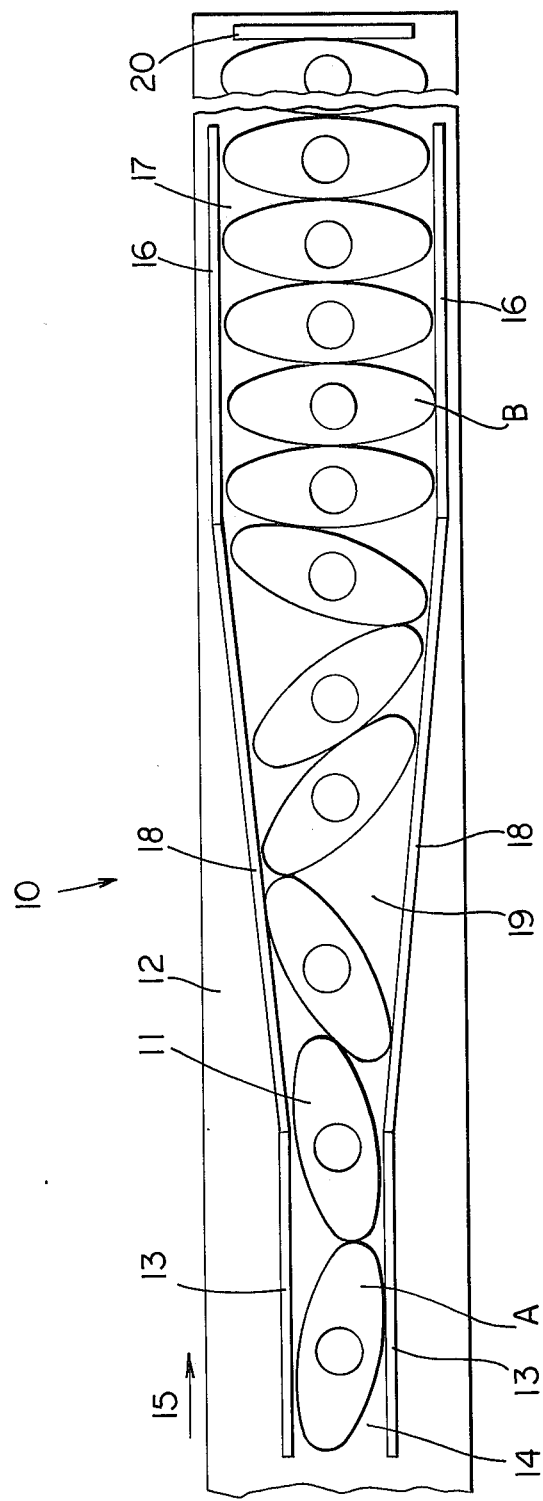
FIG. 1 in the drawing is a plan view of a conveying and accumulating device constructed according to one exemplary embodiment of the present invention, the device being illustrated with a succession of bottles or containers supported thereon so as to illustrate the manner in which the bottles are transported, oriented and accumulated.
Figures 2A, 3A:
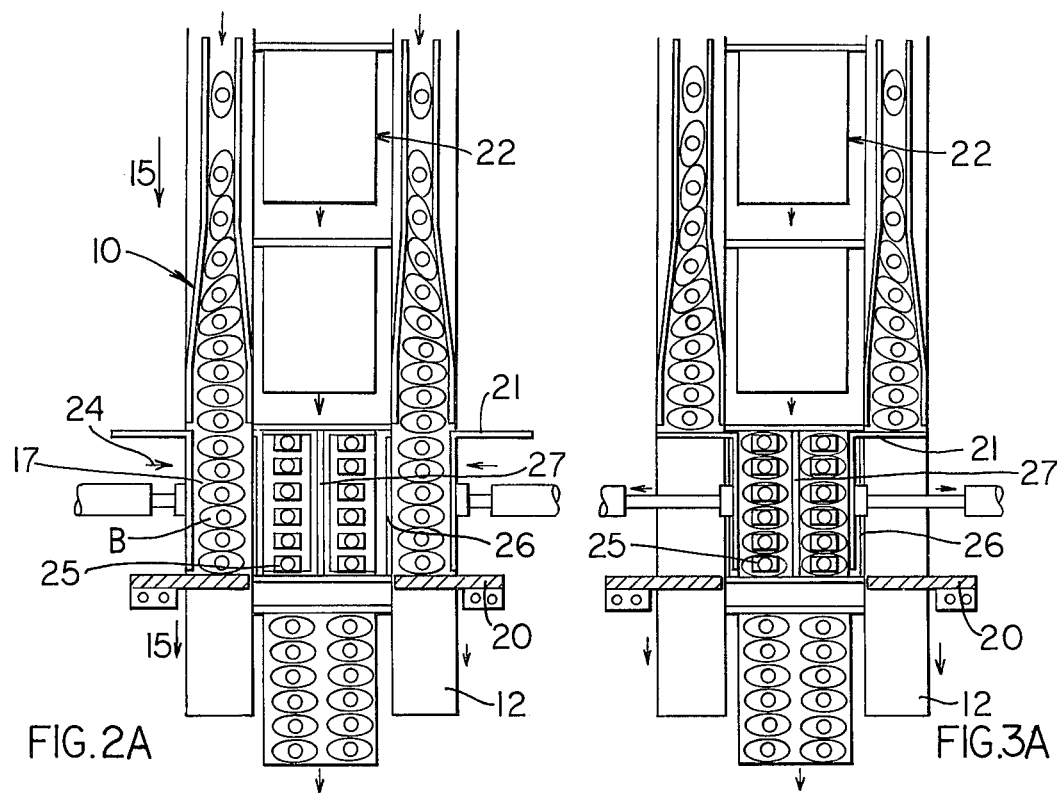
Figures 2B, 3B:
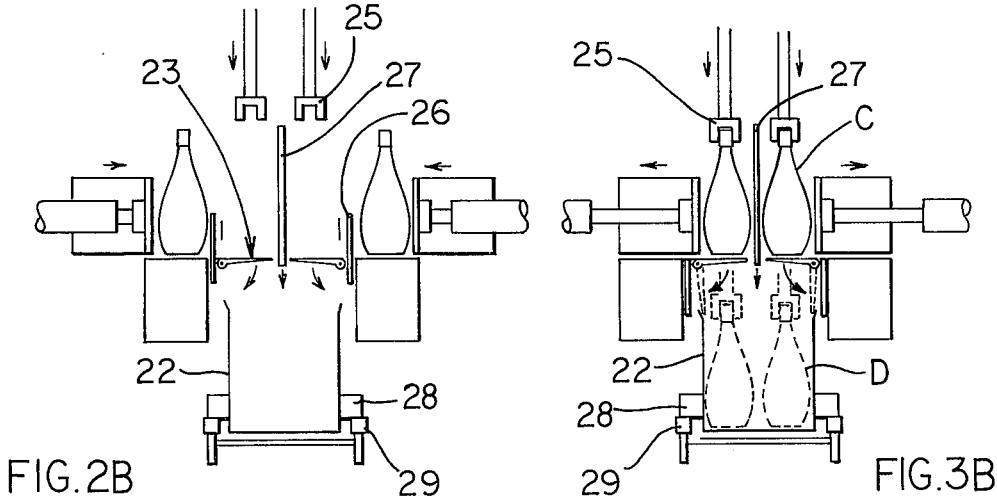

FIG. 2A is a plan view of a shampoo container packaging apparatus in which the device illustrated in FIG. 1 has been incorporated, the apparatus being illustrated with the stopped and accumulated containers in an accumulation zone on the conveyer and FIG. 2B is a vertical sectional view thereof;

FIG. 3A is a plan view of the packaging apparatus shown in FIG. 2, the apparatus being illustrated with the containers removed from the accumulation zone by a pusher plate to be packed into a carton and FIG. 3B is a vertical sectional view thereof.

DETAILED DESCRIPTION

As illustrated in the embodiment shown in the attached drawing, the present invention comprises an apparatus 10 for transporting and accumulating articles 11, such as hollow containers, bottles or the like which are used for containing liquid soap and other suitable products. The articles 11, which generally have an oval or eliptical cross-section, have a relatively flat bottom or supporting surface to permit their support and transporting by a conventional conveyer 12. Conveyer 12 in the illustrated embodiment may comprise a conventional movable endless belt, the upper reach of which is illustrated in the drawings.

The conveyer 12 has a pair of spaced-apart, substantially parallel side guides 13 associated therewith for defining therebetween an elongated transporting passage or zone 14 through which a succession of said containers 11 are moved. The side guides 13 are spaced apart by a distance which is preferably only slightly greater than the small diameter (that is, the width) of the containers 11 so that the containers 11 are thus successively moved through the zone and are disposed so that the large diameter (that is, the length) of each container 11 extends substantially parallel to the direction of movement of the conveyer, which direction of movement of the conveyer is indicated by the arrow 15.

The transporting and accumulating apparatus of the present invention is also provided with a further pair of spaced and substantially parallel side guides 16 associated therewith, which side guides are substantially parallel to the side guides 13 but are spaced a substantial distance downstream from the side guides 13. The side guides 16 define therebetween an elongated passage 17 which will hereinafter be referred to as the accumulation zone. The accumulation zone 17 has a width as defined between the opposed guides 16 which is preferably only slightly greater than the maximum diameter of the containers 11 so as to permit the containers to be accumulated within the zone 17 in adjacent side-by-side position, the vessels thus being disposed substantially within a row as illustrated in the drawing. The individual vessels within said row being disposed with their short diameters substantially aligned and extending substantially parallel to the direction of travel of the conveyer 12.

A still further pair of intermediate side guides 18 are associated with the conveyer 11, which side guides extend between and have their opposite ends positioned directly adjacent the free ends of the side guides 13 and 16. The side guides 18 are inclined at an angle relative to one another so as to define an orienting passageway or zone 19 therebetween which passageway increases in width from the input end to the output end thereof. The input end of the orienting zone 19 is disposed directly adjacent and in alignment with the output end of the transporting zone 14, whereupon the width of the orienting zone 19 then progressively increases until it reaches the output end thereof, which outward end is disposed directly adjacent the input end of the accumulation zone 17 and has a width substantially equal to the width of the accumulation zone. The orienting zone 19 thus results in a gradual and substantially uniform increase in the width of the zone confining the containers 11 as they are transported from the transporting zone 14 into the accumulation zone 17.

In the apparatus of the present invention, the preferable angle of inclination of the intermediate side quides 18 varies depending upon the cross-sectional configuration of the articles 11, the rate of movement of the conveyer 12, and other operational parameters. However, the angle of inclination of the side guides 18 is preferably selected so that the length of the side guide 18 is from about three to about ten times as long as the long diameter (that is, the length) of the container 11.

In the operation of the apparatus 10 of the present invention, the conveyer 12 is normally provided with a large quantity of containers 11 positioned thereon, which containers 11 are disposed within an elongated row on the conveyer 12 and are disposed closely adjacent and in substantial contact with one another so that the vessels are moved successively one at a time along the conveyer (rightwardly in the drawing). When the containers are being moved through the transporting zone 14, the close confinement of the containers by the side guides 13 causes the individual containers to be substantially aligned in succession and in substantial contact with one another, the individual containers being disposed so that the large diameter extends at least approximately in the direction of movement of the conveyer, such as illustrated by the container designated A in the drawing. Since the articles 11 are continuously supplied to and transported along the conveyer 11, the accumulation zone 17 contains therein a plurality of containers 11 which are disposed so that their long diameters extend substantially perpendicular to the direction of travel of the conveyer 12, as illustrated by the container designated B in the drawing. These containers 11 as disposed within the accumulation zone 17 are thus disposed in aligned and adjacent contact with one another so as to form a row of said containers. The individual containers disposed within the row defined by the storage zone 17 are positioned so that the short diameters of the containers are substantially aligned and are substantially parallel to the direction of travel of the conveyer. This orientation of the containers 11 as contained in the accumulation zone 17 thus facilitates the removal of the containers from the conveyer so as to permit their storing or packing within boxes or the like. However, even though containers 11 are continuously being removed from the accumulation zone, the continuous supply of containers 11 from the transporting zone 14 through the orienting zone 19 into the accumulation zone 17 always results in a row of containers 11 being disposed within the accumulation zone 17, substantially as illustrated on the right side of the drawing.

Considering now the movement of the containers 11 from the transporting zone 14 to the accumulation zone 17, the individual containers 11 as they leave the transporting zone 14 and enter the orienting zone 19 begin to undergo an angular turning movement relative to the supporting surface of the conveyer 12, which angular turning movement of the individual containers 11 progressively continues as the containers move along the zone 19 due to the progressively increasing width of the zone. This progressive angular turning of the containers 11 continues as they move through the zone 19 and continues until the containers 11 reach the outlet end of the zone 19. At this point, the zone 19 has a width substantially equal to the accumulation zone 17, whereupon the individual containers 11 in passing through the orienting zone 19 have thus been turned, either to the right or to the left, through an angle of approximately 90° so that the long diameter of each container 11, which was substantially parallel to the direction of travel upon entering the zone 19, is now substantially perpendicular to the direction of travel upon leaving the zone 19.

The desirable turning of the individual containers 11 as they progressively move through the orienting zone 19 occurs due to the fact that the row of containers, as it extends from the transporting zone 14 through the orienting zone 19 into the accumulation zone 17, is continuous with the successive containers being substantially in contact with one another. Thus, due to this contacting relationship between the successive containers, each trailing container tends to exert a pushing force on the next adjacent leading container, which pushing force due to the oval configuration of the container tends to swing or pivot the containers sidewardly as permitted by the ever-increasing width of the zone 19 as the containers travel therethrough. This pushing force of the trailing container on the next adjacent leading container is due to the fact that the containers within the accumulation zone 17 are either stopped or their motion suitably impeded by a stop or restriction device 20 so as to enable the containers, which are more widely spaced when located within the transporting zone 14, to be moved more closely together when in the accumulation zone 17. Further, due to the manner in which the adjacent pair of containers coact with one another so as to pivotally swing same as they move through the orienting zone 19, it is substantially impossible for two or more containers to become positioned directly adjacent one another in substantially side-by-side relationship as they move through the zone 19. Since the articles are thus positively prevented from moving into a side-by-side relationship, the articles thus cannot choke and block the guide passages as defined between the opposed side guides 16 and 18.

With respect to the stop or restriction device 20, such devices for causing stoppage and accumulation of a plurality of articles on a conveyer are well known. In an apparatus for transporting and accumulating containers of this kind, the containers transported to the accumulation zone are stopped and collected for packing thereof into cartons or the like.

As the restriction device for this purpose, a suitable stopper will be used and the containers thus stopped and accumulated will be usually removed from the accumulation zone by pushing out a predetermined number of containers to the direction perpendicular to the direction of the transportation movement. This method of stopping and collecting the transported containers is conventional in the art, and typical such stops or restriction devices are illustrated in Japanese Utility Model Publications Nos. 28504/1964, 28509/1964 and 16518/1968. Accoringly, it will be recognized by those of ordinary skill in this art that any suitable stop or restriction device of conventional construction could be utilized in conjunction with the transport apparatus of the present invention.

Thus, as described above, the present invention provides a device which permits articles or containers having a substantially flat supporting surface, which articles preferably have an oval or cliptical cross-section, to be accumulated in a very precise and uniform manner by the utilization of an extremely simple and inexpensive apparatus.

The present invention will be further described with reference to FIGS. 2A, 2B and 3A, 3B, which show a shampoo container packaging apparatus incorporating the conveying and accumulating device 10 of the present invention therein. In FIGS. 2A and 2B, the containers B are shown as contained in the accumulation zone 17 on the conveyor 12, while, in FIGS. 3A and 3B, the containers are shown as removed from the accumulation zone 17 by a pusher plate 21 to a position above the cartons 22 into which the containers are to be packed.

In the packaging apparatus shown in the drawings, twelve shampoo containers are to be packed in one carton. When the containers or bottles B transported by the conveyor 12 are stopped by the stopper 20 in the accumulation zone 17, they are pushed out of the conveyor 12 by a pusher plate 21 to the direction (shown by the arrow 24) perpendicular to the direction of the transportation movement (shown by the arrow 15) and placed on a rotatable falling-down plate 23. As shown in FIGS. 3A and 3B, the respective bottles are then grasped by the corresponding bottle holders 25, as illustrated by the container designated C in the drawing, the falling-down plate 23 is then rotated and, at the same time, the bottle holders 25 are descended to place the bottles in the carton 22, as illustrated by the container designated D in the drawing. Then, the bottle holders 25 are detached from the containers, ascended and stopped at their original positions. After the holders 25 are lifted, the falling-down plate 23 is rotated and returned to its original position.

In the drawing, 26 indicates a vertically movable guide plate, which descends when the pusher plate 21 push the containers onto the falling down plate 23 and which ascends when the pusher plate 21 is returned to its original position, thus performing its role as a guide. 27 is a center guide, which is fixed. 28 is a carton transfer plate, on which the carton 22 are placed and transferred, and 29 is a chain, by which the plate 28 is moved.

The embodiments of the invention in which we claim an exclusive property or privilege are defined as follows:

1. An apparatus for transporting, orienting and accumulating articles having at least a portion of oval cross-section defined by substantially perpendicular short and long diameters, said apparatus comprising:

conveyor means including an elongated movable conveying member traveling in a selected direction and having an upwardly facing support surface for supporting said articles thereon;

first guide means for confining therebetween the oval portion of said articles, said first guide means including a first pair of spaced side guide members disposed adjacent said support surface and defining therebetween a transporting zone, said first pair of side guide members being spaced apart by a distance which is smaller than the long diameter of said articles so as to confine therebetween the oval portion of said articles and to facilitate the movement of said articles through said transporting zone by said conveying member, said articles when in said transporting zone being disposed with the short diameters thereof substantially transverse to said selected direction;

second guide means for confining therebetween the oval portion of said articles, said second guide means including a second pair of spaced side guide members disposed adjacent said support surface and defining an accumulation zone therebetween, said second pair of guide members being spaced downstream a substantial distance from said first pair of side guide members, said second pair of side guide members being spaced apart by a distance which is substantially equal to or slightly greater than the long diameter of said articles to permit alignment of said articles in the direction of the short diameters thereof;

restricting means coacting with said articles within said accumulation zone for causing said articles within said accumulation zone to accumulate within a row extending in said selected direction, the individual articles in said row being maintained in contact with one another and being oriented so that the long diameter thereof is substantially perpendicular to said selected direction; and third guide means extending between the first and second pairs of side guide members and coacting with the oval portion of said articles for permitting the individual articles to be turned as they are being supplied from said transporting zone to said accumulation zone so that their long diameters are disposed substantially perpendicular to said selected direction when said articles reach said accumulation zone;

said third guide means including a third pair of spaced elongated side guide members disposed adjacent said conveying member and extending between said first and second pairs of side guide members, the side guide members defining said third pair being inclined relative to one another and defining an elongated orienting passage therebetween which diverges in said selected direction, said third guide means permitting the articles to be turned as they pass therethrough only when the articles in the accumulation zone are oriented with their long diameters substantially perpendicular to said selected direction and are disposed within a row which extends back into said orienting passage.

2. An apparatus according to claim 1, wherein the side guide members of said third pair are each substantially straight and are each slightly inclined at a small angle relative to said selected direction of movement of said conveying member, said third pair of side guide members defining an elongated passage therebetween which progressively increases in width from the inlet end thereof to the outlet end thereof, the inlet end of said orienting passage having a width substantially equal to the width between said first pair of side guide members, and the outlet end of said orienting passage having a width substantially equal to the width between said second pair of side guide members.

3. An apparatus according to claim 1, wherein said first pair of side guide members are spaced apart by a width which is only slightly greater than the small diameter of said articles for causing said articles when being transported along said transporting zone to be disposed on said conveying member with their long diameters extending approximately parallel to said selected direction.

4. An apparatus according to claim 1, wherein each of the inclined side guide members defining said third pair comprises a single elongated and substantially straight rail member having a length of between about three to about ten times the long diameter of said articles.

5. An apparatus according to claim 1, wherein the individual side guide members of said second pair are parallel with respect to one another and are parallel with the side guide members of said first pair, the respective side guide members of said second pair each being spaced outwardly relative to the respective side guide members of said first pair relative to the width of said conveying member, whereby the longitudinally extending centerline of the transporting zone is substantially aligned with the longitudinally extending centerline of said accumulation zone.

6. An apparatus according to claim 1, wherein the side guide members of said first, second and third pairs each comprise a substantially straight and elongated rail member, each rail member having a length substantially greater than the long diameter of said article, and the rail members defining said third pair each having a length which is at least three times greater than the long diameter of said articles.

\* \* \* \* \*